United States Patent [19]

Hoekstra

[11] Patent Number: 4,491,093
[45] Date of Patent: Jan. 1, 1985

[54] ENERGY AND WATER RECOVERY FROM FLUE GASES

[76] Inventor: I. Arthur Hoekstra, 906 Woodlyn Dr. N., Cincinnati, Ohio 45230

[21] Appl. No.: 593,404

[22] Filed: Mar. 26, 1984

[51] Int. Cl.³ .............................................. F22D 1/02
[52] U.S. Cl. .................................. 122/420; 110/215; 122/1 C; 122/451 S
[58] Field of Search ............ 122/420, 421, 412, 451 S, 122/1 R, 1 C, 31 R, 5.5 A; 110/215

[56] References Cited

U.S. PATENT DOCUMENTS

| | | | |
|---|---|---|---|
| 4,173,949 | 11/1979 | Ruethe | 122/421 |
| 4,398,501 | 8/1983 | Mischiatti | 122/1 R |
| 4,436,057 | 3/1984 | Cross et al. | 110/215 X |
| 4,445,325 | 5/1984 | Tratz et al. | 122/451 S X |

*Primary Examiner*—Edward G. Favors
*Attorney, Agent, or Firm*—Diller, Ramik & Wight

[57] ABSTRACT

Energy and water are recovered from flue gases by cooling them to a temperature sufficiently below the acid dew point temperature by contact with an aqueous stream so as to recover the sensible heat and to reduce the water content of the flue gases by about 50%. The water by which the aqueous stream is enriched is subsequently flashed off to cool the stream back to its original temperature and the water vapor is then compressed to generate a higher temperature vapor stream which is condensed to recover the water and extract heat. The aqueous stream is continuously enriched with material such as calcium carbonate to control the pH sufficiently as to avoid substantial corrosion due to acidic gases removed from the flue gases and the aqueous stream is purged continuously or periodically to remove compounds such as chlorides, calcium sulphates, and fly ash solids picked up from the flue gases. The system may be operated in two stage fashion in which separate aqueous streams are employed to cool the flue gases in two serial stages.

9 Claims, 5 Drawing Figures

ENERGY AND WATER RECOVERY FROM FLUE GASES

BACKGROUND OF THE INVENTION

The recovery of residual energy from exhaust gases, before being discharged to the atmosphere, has been an objective of engineers since the development of the first steam engines. To this end, it has been the practice to provide steam generating plants with combustion air preheaters and economizers (in which the feed water is preheated) both located in the gas passed to abstract hat from the flue gases flowing therethrough. However, it is generally recognized that the amount of heat that can be abstracted from the flue gases by such conventional air preheaters and economizers is limited by the need for keeping the heat exchange surfaces of these units at a temperature above the acid dew point of the flue gases flowing thereover to avoid the objectionable consequences of having the moisture and acids in the flue gases condense on these heat exchange surfaces, see the Herbst U.S. Pat. No. 4,147,135 of Apr. 3, 1979; the Merritt U.S. Pat. No. 3,910,236 of Oct. 7, 1975; the Marchiex U.S. Pat. No. 3,202,134 of Aug. 24, 1965; and the Switzer, Jr. U.S. Pat. No. 3,148,665 of Sept. 15, 1964. In the case of air preheaters, this has always been an especially troublesome problem as the incoming air is much colder than the flue gases and the conventional solution of this problem is to recirculate part of the already preheated air with the incoming air. Conventional arrangements, therefore, extract little, if any, of the latent heat energy contained in the water vapor present in flue gases and the recovery of sensible heat is likewise reduced.

Many fuels such as wood, fuel oil and natural gas generate water from combustion of the hydrogen content or from the initial moisture content. This water is normally discharged to the atmosphere where it becomes apparent as a cloud of steam.

Currently, there is a growing trend to wash coal before combustion to remove ash and sulfur compounds therefrom. This requires that the coal be ground to a fine size to facilitate the washing process. After this step, the coal is normally conveyed to the boiler as a water slurry and fed directly to the boiler in that condition. This excess water must be evaporated in the fire box causing a loss of heat. However, it becomes water vapor in the flue gases and the heat can be recovered by this invention.

BRIEF SUMMARY OF THE INVENTION

In a single stage or multi-stage cooling process the flue gases are cooled to a temperature in the range of about 80° F. to about 110° F. The cooling is effected by at least one closed cycle liquid aqueous stream to which alkaline material is added to prevent corrosion problems, and the stream is at least periodically purged to remove reactants. The stream picks up, by condensation, at least about 50% of the initial water content of the flue gases, in addition to absorbing polluting gaseous materials such as oxides of sulphur, HCl, etc., and entraining solids such as fly-ash. Temperature equilibrium of the aqueous stream is effected by flashing water vapor therefrom and compressing the water vapor so flashed to produce a higher temperature vapor stream. The thus cooled aqueous stream is returned to the contact cooling stage and heat as well as water is recovered from the gaseous stream by condensation.

The system may be multi-stage. For example, the flue gases may be cooled in a first stage to a temperature in the order of 120° F. to 160° F. by a first stage contact cooling with aqueous medium. The aqueous medium in this stage, to which lime for example may be added, may be circulated partly in closed cycle and partly to purge with heat recovery being effected in the closed cycle portion whereas additional heat recovery and water recovery being effected in the purge stream portion. In a second stage, the flue gases are further cooled as described in the preceeding paragraph, with further heat and water recovery as also described.

This invention drops the temperature of the exhaust gases far below the acid dew point temperature and actually promotes the condensation of about 50% or more of the water vapor which is initially present in the flue gases to recover the latent heat of this condensed water plus the sensible heat of the gases. This recovery is effected by an aqueous stream which directly contacts the flue gases. Water which forms from combustion plus moisture content of the fuel is condensed in the aqueous stream.

The exhaust gases are cooled to a low temperature by a circulating aqueous stream containing alkaline ions which immediately combine with the acid constituents of the flue gas. The alkaline ions also act as a chemical buffer to maintain a suitable pH to minimize corrosion.

The circulating aqueous stream absorbs the heat of the exhaust gases by direct contact thus resulting in a rise in stream temperature. The stream then passes to a vacuum chamber where some of the water evaporates to remove the heat and restore equilibrium temperature, and finally the stream returns to the heat absorber in a closed cycle. Water vapors, which are released from the evaporator at a low temperature, are compressed to form a higher temperature vapor stream and passed to a condenser where the vapors condense and the energy is obtained at a higher temperature where the heat can be utilized.

BRIEF DESCRIPTION OF THE DRAWING FIGURES

DETAILED DESCRIPTION OF THE INVENTION

Figure 1:
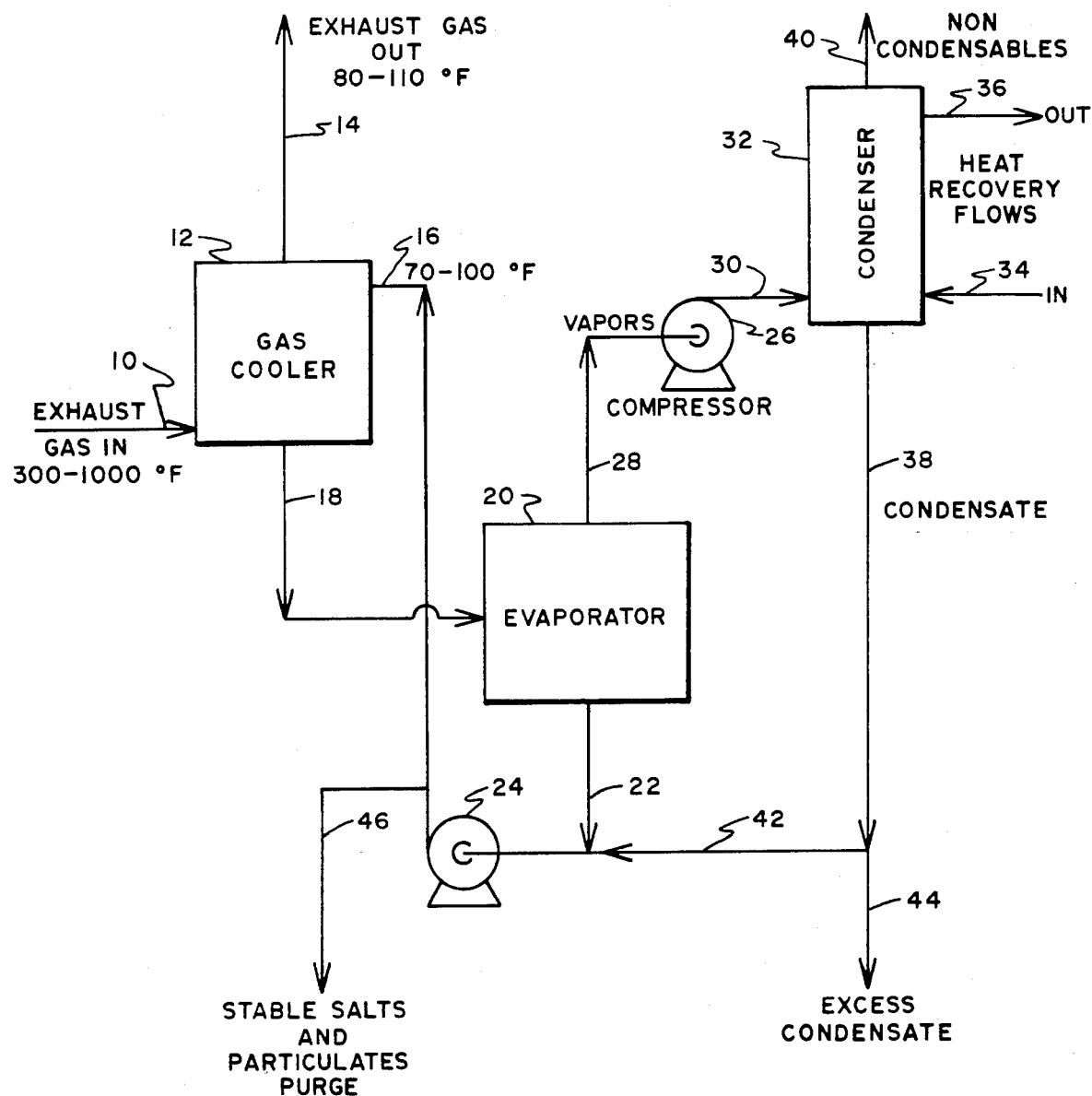
FIG. 1 is a diagram illustrating one form of the invention.
Figure 5:
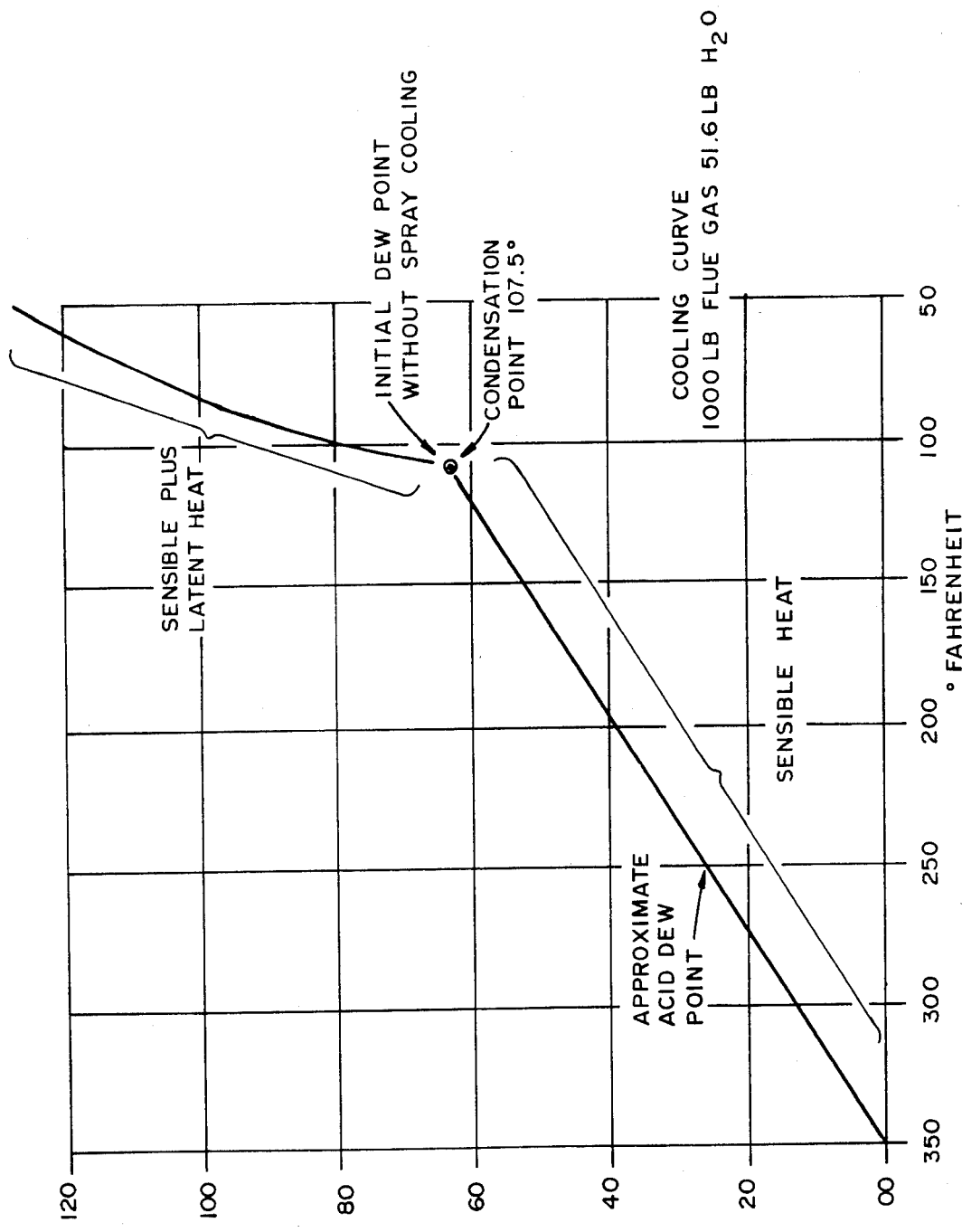

Referring to the embodiment of the invention illustrated in FIG. 1, flue gases are illustrated entering the system as designated at 10 and are directed to the gas cooler indicated generally by the reference character 12. The gases are exhausted at 14 to the atmosphere after having been cooled to a temperature in the range of about 80° to about 110° F. The incoming gases at 10 contain, in addition to fly-ash and polluting gaseous substances such as oxides of sulphur and the like, a significant amount of water vapor and the temperature of the exhaust gas at 14 is adjusted by the flow of coolant to the gas cooler 12 such that about 50% of the water vapor initially contained in the stream 10 is removed in the cooling process. Typically, the acid dew point temperature of the gases at 10 will be in the order of 250° F. if the gases at 10 contain any significant amount of acids and water vapor, see FIG. 5. Thus, the temperature of 80°–110° F. at 14 should be sufficient to remove about half of the initial water content of the gases at 10.

The gas cooler 12 preferably comprises a multi-stage gas scrubber and an initially cool aqueous stream is directed thereto as at 16, the temperature typically being in the order of 70°–100° F. This aqueous stream flows in a closed cycle and, within the cooler 12, picks up the latent heat of the water vapor condensed from the exhaust or flue gases plus the sensible heat of the gases. The flow rate of the aqueous stream must be such as to effect the requisite cooling of the gases leaving at 14 and so that the high temperature discharge of the aqueous stream at 18 from the cooler balances the heat recovered by the system. The high temperature aqueous stream is directed to the evaporator vessel 20 where the high temperature stream at 18 is cooled to equilibrium temperature and is returned at 22 to the pump 24 whose outlet supplies the input stream at 16 to the cooler 12. In the evaporating tank 20, the water vapor picked up from the exhaust gases at 10 is removed plus an additional quantity of water vapor to accommodate for the sensible heat picked up by the aqueous stream in the cooler 12. This water vapor is flashed off in the evaporator 20 by means of the compressor indicated generally by the reference character 26 and whose inlet at 28 is connected to the evaporator vessel whereas its outlet at 30 is connected to the condensor 32. The suction side of the compressor 26 establishes sufficient vacuum within the evaporator vessel 20 to flash off the requisite amount of water vapor to establish the equilibrium temperature conditions for the closed cycle of the aqueous stream and at the pressure side at 30, a high temperature gaseous stream is formed. Thus, the work done by the compressor 26 is converted with high efficiency into heat energy of the high temperature gaseous stream at 30 and, in any event, that a sufficiently high temperature as to produce a usable source of heat for heat recovery. For this purpose, the condensor 32 causes the high temperature gaseous stream to flow over the surfaces of an indirect heat exchanger to which water, for example, is supplied at 34 at normal temperature whereas the heated water outlet at 36 may be supplied for ultimate use. At the same time, the water vapor in the high temperature stream at 30 is largely condensed and flows out through the condensate line 38 and non-condensable gases flow to discharge at 40. The condensate is partially returned at 42 to the inlet of the pump 24 whereas the remainder at 44 is recovered for use.

Substantial savings in energy, in addition to the capability for condensate recovery, are possible with the present invention.

Curves A, B and C show the heat that can be recovered by cooling 1000 lb. of dry exhaust gases at various temperatures containing 52 lb. of water. The following table shows the heat which can be recovered from flue gases at varying temperatures when cooled to 80 F.

TABLE I

| Stack Temperature | Heat Recovered |
|---|---|
| 300° F. | 10% |
| 400° F. | 13% |
| 600° F. | 20% |

By recovering the energy normally being discharged, the system can reduce the fuel requirements for the boiler or the energy can be utilized elsewhere.

Certain acids such as hydrogen chloride and sulfur trioxide form stable compounds with the alkaline ions in solution and these will not be released in the evaporator. Other acids such as sulfur dioxide and carbon dioxide will be released in the evaporator along with water vapor. These gases are handled as non-condensible in the condenser and if desired they can be recovered. This invention thus makes it possible to recover energy and water, as well as remove acid gases from the flue gases.

A combustion process which generates hydrochloric acid gases is the incineration industry where vinyl plastics release acids that are very corrosive. High exhausts gas temperatures are maintained to avoid an acid dew point condition. Curves B and C show the energy that can be recovered from this operation.

There is a growing trend to wash coal before combustion to remove ash and sulfur compounds which requires that the coal be ground to a fine size to facilitate the process. After this step, the coal can be conveyed to the boiler as a water slurry and fed directly to the boiler. Then excess water must be evaporated in the fire box and it becomes water vapor in the flue gases. This water vapor has a high latent heat and by condensing the vapors the heat can be recovered. Curve D shows the energy that can be recovered from this operation. Approximately 20% of the energy can be recovered by this method.

In addition, it will be appreciated that the capability exists for significantly reducing pollution otherwise present in the flue gases at 10. As stated hereinbefore, the flue gases may contain a significant quantity of acidic gases such as oxides of sulphur which are adsorbed into the aqueous stream leaving at 18. In order to minimize problems due to corrosion, by virtue of the presence of the acidic nature of the stream at 18, alkaline material may be continuously introduced into the stream at 16. Thus, it will be necessary either periodically or continuously to discharge material from the closed cycle aqueous stream as is indicated at reference character 46 in FIG. 1.

In any event, it will be appreciated that this system accordingly to FIG. 1 departs drastically from normal operation in that the flue gases are deliberately cooled to a temperature well below the acid dew point thereof so as to recover a significant amount of water vapor therefrom, the latent heat of which would otherwise be lost or wasted. The closed cycle aqueous stream is equilibrated as to temperature by virtue of flashing off water vapor in the evaporator vessel 20 and by compressing same at 26, the high temperature gaseous stream 30 is produced whose temperature is sufficiently high as to represent a useful source of heat recovery as indicated. To compensate for water lost at the purge line 46, and due to the excess water which must be evaporated in the vessel, part of the condensate is continuously returned at 42.

Figure 2:
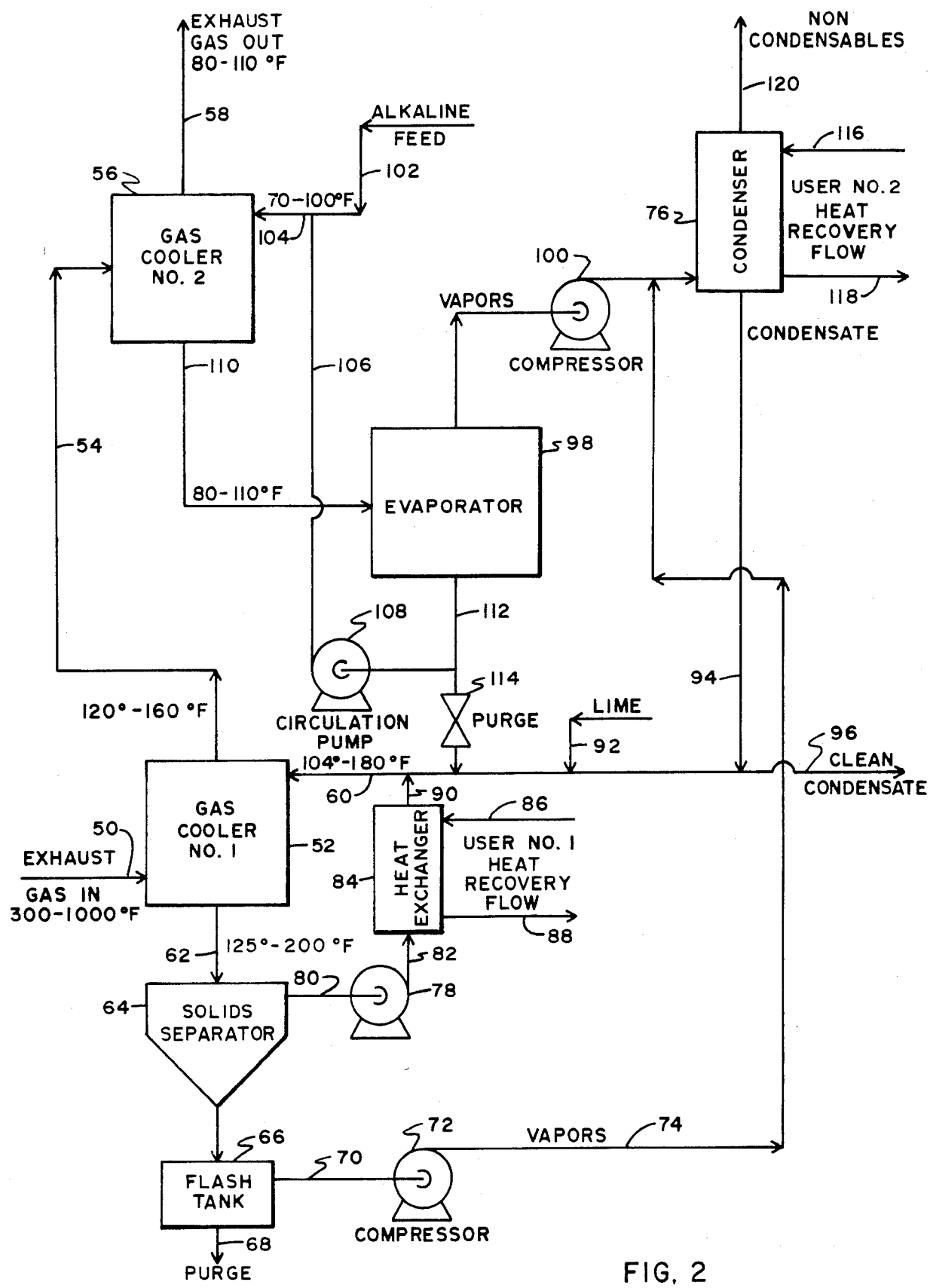
FIG. 2 is a diagram illustrating another form of the invention.
Figure 3:
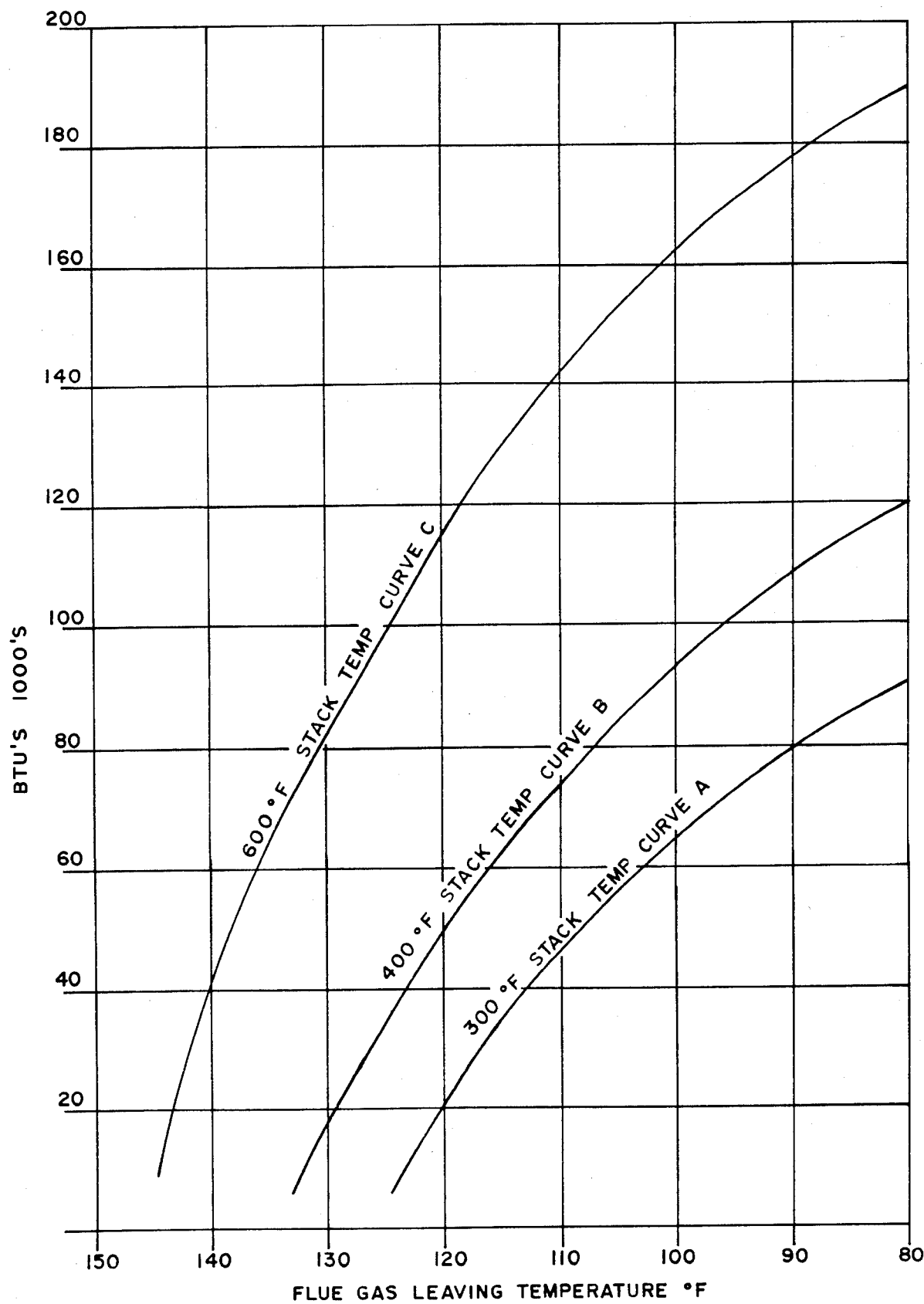
FIGS. 3, 4 and 5 are graphs illustrating certain energy recovery aspects of the invention.
Figure 4:
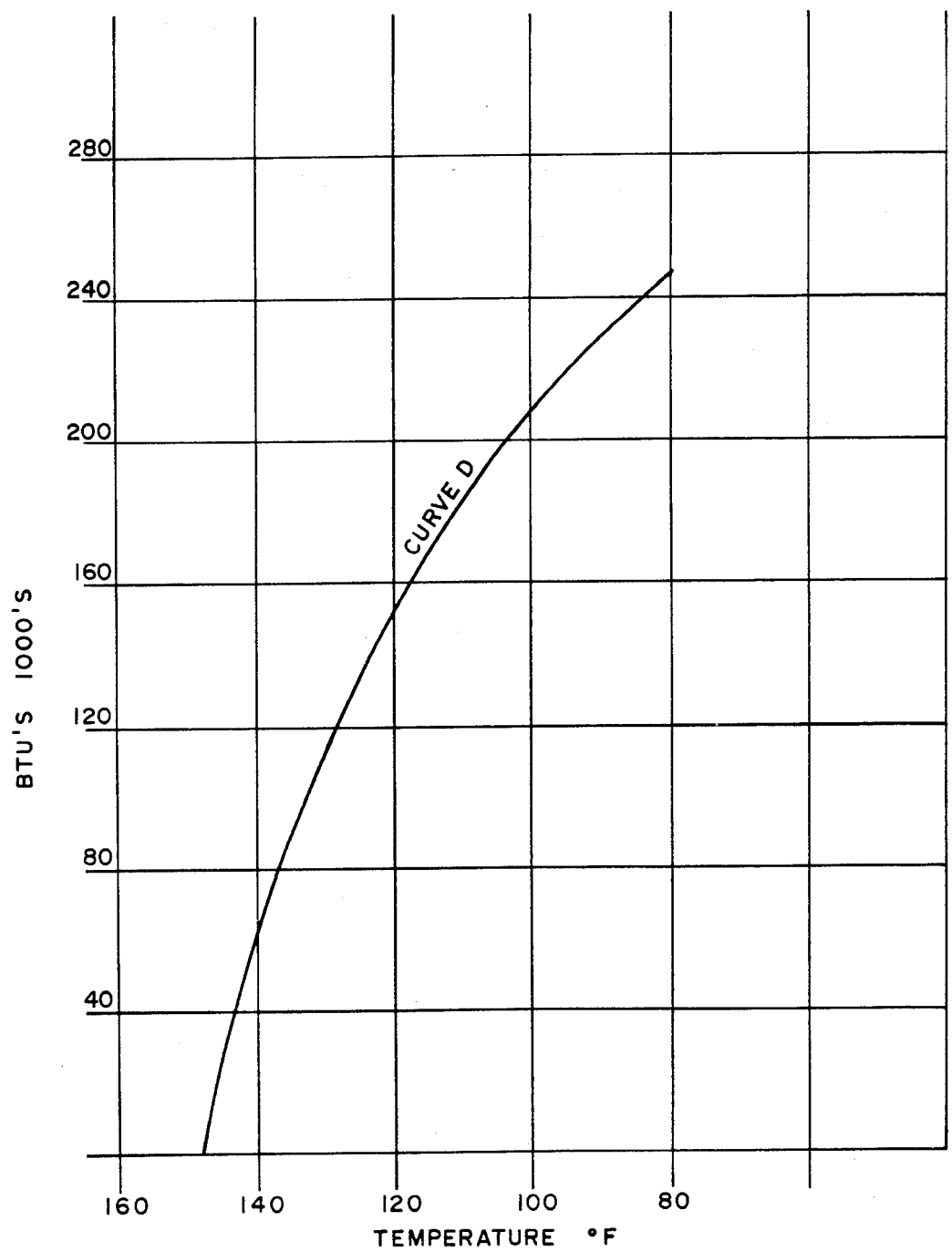

The system as shown in FIG. 2 represents a two-stage gas cooling system. Thus, the flue gases incoming at 50 are cooled in a first-stage cooler indicated generally by the reference character 52 and the discharge of flue gases therefrom at 54 is then applied to a second-stage cooler as indicated by the reference character 56, the final exhaust being at 58 where, once again, the final flue gas temperature is in the range of about 80° to about 110° F.

The first stage of flue gas cooling is effected by the alkaline aqueous stream introduced at 60 into the gas cooler 52 at a temperature in the range of about 104° F. to about 180° F. as indicated. After passing through the contact cooler 52 the aqueous stream emerges at 62 at a temperature in the range of about 125° F. to about 200° F. as illustrated. This emergent stream is passed to the solids separator 64 where solids are largely removed and the cleansed stream is then passed to the flash tank or vessel 66 which is periodically or continuously purged at 68.

Heat is abstracted from the liquid in the tank 66 by flashing water vapor from it under the reduced pressure at the inlet line 70 to the compressor 72. This water vapor is converted to a high temperature water vapor stream by the compressor 72 and such stream is passed as at 74 to the condenser 76.

The amount of the heated aqueous stream from the separator 64 is recirculated by the pump 78 through its suction line 80 to maintain temperature equilibrium through the closed cycle portion of this stream. This is effected by passing the recirculated stream at 82 through the indirect heat exchanger 84 to which the heat recovery medium is applied through the inlet and outlet lines 86, 88. The temperature equilibriated aqueous stream is returned through the outlet 90 to the main line 60. The main line 60 also receives the alkaline material, lime, at 92 and make-up condensate at 94 whereas excess condensate is recovered at 96.

It will be appreciated that for curves C and D, which have high heat recoveries, a portion of the heat of the gases is recovered in the cooler 52 at a higher temperature. It is a principle of thermodynamics that energy at a high temperature has more value than at low temperature and thus, if conditions merit, the extra step of two stage cooling is desirable. The heat can be recovered using an indirect heat exchanger 84 or a vapor compressor similar to 100 and evaporator 98 can be used. It is also possible to use the first step of two stage cooling without using the second step as shown.

On the other hand, relatively little of the sensible heat of the flue gases is recovered in the second stage gas cooler 56, but water vapor has been added during contact in cooler 52. Water vapor is removed from the evaporator vessel or flash tank 98 in the closed cycle aqueous stream of the second stage cooling to equilibrize the temperature due to the combined sensible and latent heat input. Therefore, most of the water vapor flashed off by the compressor 100 is due to the water picked up from gas cooler #1 and make-up water is required for the closed cycle aqueous stream of the second stage cooling. Alkaline feed is suppied at 102 and enters the aqueous stream at 104 to the cooler 56 from the recirculating discharge line 106 of the pump 108. The aqueous stream leaving the cooler 56 at 110 is circulated to the evaporator 98 whereas the cooled stream leaving the evaporator 98 at 112 is returned to the pump 108 and, through a suitable purge valve 114, to the main line 60 of the first stage aqueous stream.

Under most modern combustion conditions, the amount of $SO_3$ that is formed is minimum and it can be purged as $CaSO_4$ in a soluble form. However, the solubility of $CaSO_4$ is limited and the operation of the gas cooler 52 must be carefully monitored so scaling does not occur. If an excess of calcium sulfate is observed, an effluent holding tank or separator 64 is utilized to promote the crystallization of $CaSO_4$ salts. Fortunately, $CaSO_4$ has an inverted solubility curve and at 104° F., the maximum solubility is obtained. Thus, the heat exchanger shown as the cooler 52 in FIG. 2 will not scale because as the liquid cools the solubility increases down to the temperature of 104° F. In practice, therefore, the circulation liquid leaving the gas cooler 52 can be slightly supersaturated with respect to $CaSO_4$. This supersaturation is then released in the effluent holding tank by promoting crystallization on a large bed of seed crystals. Next, the liquid goes to the heat exchanger to be cooled, but the solution does not scale because $CaSO_4$ becomes more soluble as it cools.

The effluent holding tank will also promote the separation of particulates from the circulating stream. A crude fly ash collection method can be utilized prior to the cooler 52 and the final particulate removal will be accomplished by the "washing action" in the circulation stream and by forming the nuclei for condensation in the cooler 52 and the cooler 56. Particulates are thus collected and finally purged from the effluent holding tank or separator 64.

What is claimed is:

1. The method of recovering energy and water from high temperature flue gases containing significant amounts of sensible heat and latent heat present as water vapor, which comprises the steps of:
    (a) contacting an aqueous medium having an initial temperature lower than said high temperature with the flue gases to cool the flue gases to a temperature in the range of about 80° F. to about 110° F. which is sufficiently below the acid dew point temperature thereof to condense at least about 50% of the water vapor initially present in the flue gases;
    (b) cooling the heated aqueous medium back to its initial temperature by flashing water vapor therefrom in excess of that picked up in step (a), returning the cooled aqueous medium to step (a) and supplying make-up water to the aqueous medium in amount sufficient to compensate for said excess;
    (c) compressing the water vapor obtained in step (b) to increase the temperature thereof; and
    (d) condensing the compressed water vapor of step (c) to recover the latent heat thereof and recovering the water so condensed.

2. In a heat recovery system for use with processes producing flue gases containing significant amounts of sensible heat and latent heat present as water vapor, the improvement which comprises:
    means for contacting said flue gases with an aqueous medium to cool said flow gases well below the acid dew point temperature thereof and condense at least about 50% of said water vapor into the aqueous medium;
    compressor means for flashing water vapor from said aqueous medium and for compressing some to produce a high temperature stream of compressed water vapor; and
    condenser means for recovering water and heat from said compressed water vapor.

3. The method of recovering heat and water from high temperature flue gases while also reducing the content of acidic gases therein, which comprises the steps of:
    (a) generating a high temperature water vapor stream by contact cooling of the flue gases with an aqueous stream to reduce the heat content of the flue gases, and flashing water vapor from the aqueous stream and compressing the water vapor to form said high temperature water vapor stream, (b) adding alkaline material to the aqueous stream and at least periodically purging compounds from the aqueous stream; and (c) cooling said high temperature water vapor stream to recover water and heat therefrom.

4. The method according to claim 1 wherein make-up water supplied in step (b) comprises condensate recovered in step (d).

5. The method as defined in claim 3 including the steps of:

(d) generating a second high temperature water vapor stream by a second stage contact cooling of the flue gases with a second aqueous stream to further reduce the water vapor content of the flue gases, flashing water vapor from said second stream and compressing the water vapor to form said second high temperature water vapor stream, and returning the cooled second aqueous stream into contact with the flue gases in the contact cooling stage first mentioned; and (e) cooling the second high temperature water vapor stream to recover water and heat therefrom.

6. The method as defined in claim 5 wherein the aqueous stream of step (a) is partially recirculated in closed cycle and is cooled to recover heat therefrom and is partially purged in a stream from which said water vapor of step (a) is flashed.

7. The method as defined in claim 3 wherein the aqueous stream of step (a) is partially recirculated in closed cycle and is cooled to recover heat therefrom and is partially purged in a stream from which said water vapor of step (a) is flashed.

8. In a heat recovery system as defined in claim 2 wherein said means for contacting comprises serial and separate stages of contact cooling and second compressor means for flashing a second stream of water vapor from a stage of contact cooling different from that to which the compressor means first mentioned is connected, and for compressing such second stream.

9. The method as defined in claim 5 which utilizes the inverted solubility properties of calcium sulfate to control the scaling tendencies which are present when saturated calcium sulfate solutions are cooled to recover the heat.

* * * * *

UNITED STATES PATENT AND TRADEMARK OFFICE
CERTIFICATE OF CORRECTION

PATENT NO. : 4,491,093
DATED : January 1, 1985
INVENTOR(S) : I. Arthur Hoekstra

It is certified that error appears in the above-identified patent and that said Letters Patent is hereby corrected as shown below:

Claim 2, line 6, change "flow" to ---flue---.

Signed and Sealed this

Seventh Day of May 1985

[SEAL]

Attest:

DONALD J. QUIGG

Attesting Officer   Acting Commissioner of Patents and Trademarks